(12) United States Patent
Jin et al.

(10) Patent No.: US 8,259,477 B2
(45) Date of Patent: Sep. 4, 2012

(54) MULTIPHASE RESONANT CONVERTER FOR DC-DC APPLICATIONS

(75) Inventors: Taotao Jin, Irvine, CA (US); Keyue Smedley, Aliso Viejo, CA (US)

(73) Assignee: The Regents of the University of California, Oakland, CA (US)

( * ) Notice: Subject to any disclaimer, the term of this patent is extended or adjusted under 35 U.S.C. 154(b) by 234 days.

(21) Appl. No.: 12/130,102

(22) Filed: May 30, 2008

(65) Prior Publication Data
US 2008/0298093 A1    Dec. 4, 2008

Related U.S. Application Data

(60) Provisional application No. 60/940,926, filed on May 30, 2007.

(51) Int. Cl.
*H02M 3/315* (2006.01)
(52) U.S. Cl. .......................... 363/69; 363/127
(58) Field of Classification Search ............ 363/65, 363/69–72, 127, 21.06, 21.14; 323/272
See application file for complete search history.

(56) References Cited

U.S. PATENT DOCUMENTS

| | | | |
|---|---|---|---|
| 4,695,933 A * | 9/1987 | Nguyen et al. | 363/17 |
| 5,774,350 A * | 6/1998 | Notaro et al. | 363/89 |
| 5,946,206 A * | 8/1999 | Shimizu et al. | 363/65 |
| 6,574,125 B2 * | 6/2003 | Matsukawa et al. | 363/71 |
| 6,822,881 B2 * | 11/2004 | Elferich | 363/21.02 |
| 7,054,175 B2 * | 5/2006 | Kurio et al. | 363/65 |
| 7,072,194 B2 * | 7/2006 | Nayar et al. | 363/71 |
| 7,596,007 B2 * | 9/2009 | Phadke et al. | 363/71 |
| 2006/0109696 A1 * | 5/2006 | Ren et al. | 363/81 |
| 2007/0086224 A1 * | 4/2007 | Phadke et al. | 363/65 |
| 2008/0205088 A1 * | 8/2008 | Chung et al. | 363/17 |

* cited by examiner

*Primary Examiner* — Harry Behm
(74) *Attorney, Agent, or Firm* — Dickstein Shapiro LLP; Kenneth S. Roberts

(57) ABSTRACT

The various embodiments and example provided herein are generally directed to novel multiphase resonant converters. In an embodiment, a multiphase resonant converter comprises N unit resonant converters having inputs and outputs connected in parallel, respectively. Each unit converter comprises an inverter, a LLC series resonant tank, and a rectifier. In a preferred embodiment, the inverters of the N unit converters are driven by N drive signals phase-shifted $2\pi/N$ degrees apart. During operation, the current of the multiphase converter is shared among the unit converters, resulting in a smaller current in each unit converter. The smaller current in each unit converter reduces conduction losses, thereby increasing the efficiency of the multiphase converter. In addition, the smaller current in each unit converter reduces the amount of stress placed on individual components of the converter allowing for the use of lower tolerance components. Further, the multiphase converter has automatic current sharing ability.

8 Claims, 9 Drawing Sheets

US 8,259,477 B2

MULTIPHASE RESONANT CONVERTER FOR DC-DC APPLICATIONS

RELATED APPLICATION

This application claims the benefit of provisional application 60/940,926 filed on May 30, 2007, the specification of which is incorporated in its entirety herein by reference.

FIELD OF THE INVENTION

The present invention related to converters and, more particularly, to multiphase resonant converters for dc-dc applications.

BACKGROUND INFORMATION

Dc-dc converters are used to convert one voltage to another voltage level. Applications for dc-dc converters include converting dc power from a battery to a lower voltage to power circuits in a portable electronic device, e.g., cell phone.

FIG. 1 shows the basic topology of a conventional LLC series resonant converter for converting a voltage at its input $V_g$ to another voltage $V_o$ at its output. The LLC series resonant converter comprises an inverter, an LLC series resonant tank, and a rectifier. The inverter is realized by a half-bridge inverter with switches $M_p$ and $M_n$ that are driven complementary to generate a square wave at the input of the resonant tank. The resonant tank comprises an inductor $L_s$, a series capacitor $C_s$, and an inductor $L_p$ connected in series to realize resonance. The inductor $L_p$ is in parallel with the load. The rectifier comprises a center-tapped transformer, a filter capacitor $C_F$, and two rectifier diodes $D_P$ and $D_N$. The rectifier rectifies the ac waveform from the resonant network into a dc output. In low output voltage high current applications, the two rectifier diodes must be replaced with synchronized rectifiers (SR) to reduce the voltage drop (conduction losses) across each semiconductor rectifier.

The LLC series resonant converter has the following features: natural zero voltage switching at both the inverter and rectifier sides, wide load range, limited switching frequency swing, and fast transient response, all of which closely approximate the required characteristics of the desired dc-dc converter. However, the large circulation currents in LLC series resonant converters limit their application. The large circulation currents place high stress on the semiconductor switches, capacitor and inductors of the resonant tank, requiring the converters to use higher tolerance components. Further, the large circulation currents increase conduction losses, reducing the efficiency of the converters.

Therefore, there is a need for dc-dc converters that preserve the desirable features of LCC series resonant converters while overcoming their limitations.

SUMMARY

The various embodiments and example provided herein are generally directed to novel multiphase resonant converters.

In an embodiment, a multiphase resonant converter comprises N unit resonant converters having inputs and outputs connected in parallel, respectively. Each unit converter comprises an inverter, a LLC series resonant tank, and a rectifier. In a preferred embodiment, the inverters of the N unit converters are driven by N drive signals phase-shifted $2\pi/N$ degrees apart.

During operation, the current of the multiphase converter is shared among the unit converters, resulting in a smaller current in each unit converter. The smaller current in each unit converter reduces conduction losses, thereby increasing the efficiency of the multiphase resonant converter. In addition, the smaller current in each unit converter reduces the amount of stress placed on semiconductor switches and other individual components of the converter allowing for the use of lower tolerance components. Further, the multiphase converter has automatic current sharing ability without the need for additional current sensor and control circuitry.

The multiphase resonant converter provides the above advantages over conventional LLC series resonant converters while preserving desirable features of conventional LLC series resonant converters including zero voltage switching at both inverter and rectifier sides, wide load range, and fast transient response.

Also described herein are synchronous rectifiers for use in power switching converters. The synchronous rectifiers are used in low output voltage applications where the voltage drop across a diode rectifier cannot be tolerated.

In one embodiment, a synchronous rectifier circuit comprises first and second synchronous rectifiers and a logic circuit that is configured to turn on the switches of the first and second synchronous rectifiers based on whether the diodes of the first and second synchronous rectifiers are in the "ON" or "OFF" state.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. It is also intended that the invention is not limited to require the details of the example embodiments.

BRIEF DESCRIPTION OF THE FIGURES

The details of the invention, including fabrication, structure and operation, may be gleaned in part by study of the accompanying figures, in which like reference numerals refer to like segments.

DETAILED DESCRIPTION

To satisfy high current, high efficiency, fast transient, and low profile requirement for dc-dc conversion, new converters are provided targeting the following features: 1) Voltage fed inverter stage for fast transient response and lower voltage stress; 2) ZVS switching resonant power stage for high frequency (~2 MHz) high efficiency operation; 3) Bipolar, naturally balanced transformer operation, with lowest possible turns ratio and minimal number of windings; 4) Narrow switching frequency range (if resonant topologies are used); 5) Synchronous rectifier (SR) for high efficiency; and 6) Multi phases with automatic current sharing and low output current ripple.

The various embodiments and example provided herein are generally directed to novel multiphase resonant converters that overcome limitations of conventional LLC series resonant converters while preserving desirable features of conventional LLC series resonant converters including zero voltage switching at both inverter and rectifier sides, wide load range, and fast transient response.

Figure 1:
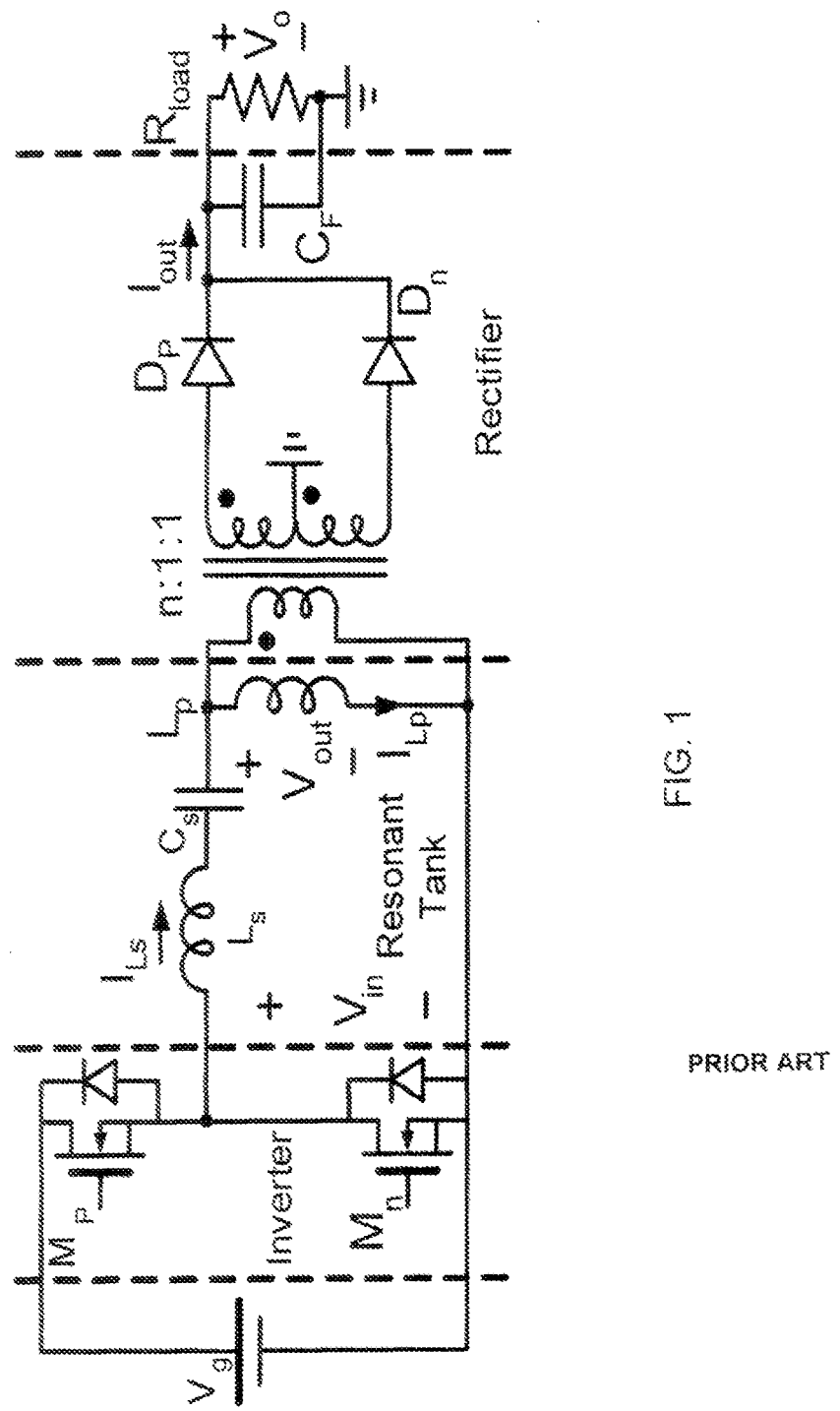
FIG. 1 is a circuit schematic of a conventional LLC series resonant converter.
Figure 2:
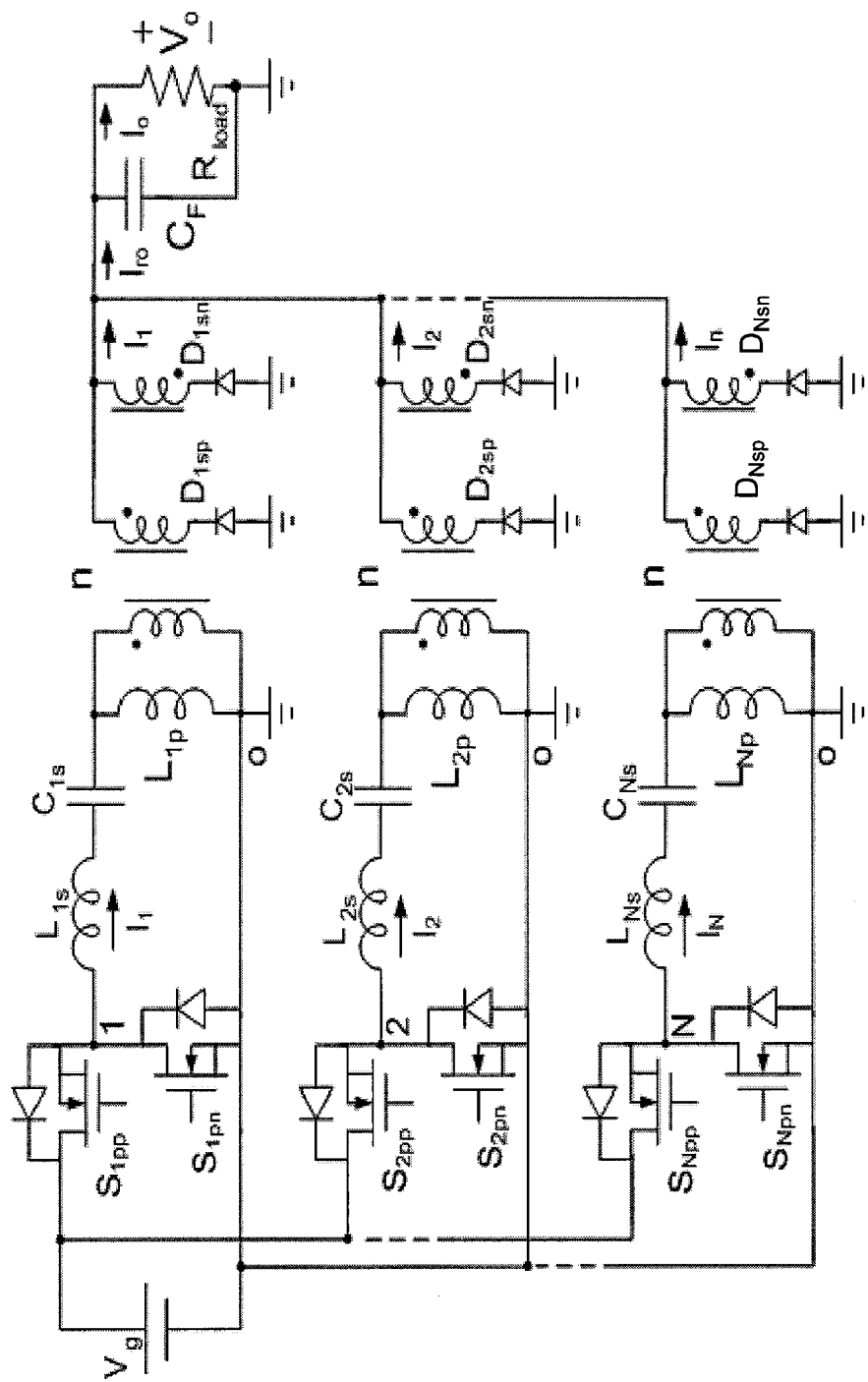
FIG. 2 is a circuit schematic of an N-phase LLC series resonant converter according to an embodiment of the present invention.

FIG. 2 shows an exemplary N-phase resonant converter according to an embodiment of the invention. The N-phase resonant converter comprises N units of LLC series resonant converters, in which the inputs and outputs of the N resonant converters are connected in parallel, respectively. Each LLC series resonant converter comprises an inverter, a resonant tank and a rectifier. The inputs of the N resonant converters are connected in parallel to the input dc voltage $V_g$, and the outputs of the N resonant converters are connected in parallel to a filter capacitor $C_F$ and the load receiving the output dc voltage $V_o$ of the N-phase resonant converter.

In the embodiment shown in FIG. 2, each inverter is a half-bridge inverter comprising MOSFET switches. The MOSFET switches may be replaced by IGBT, BJT, MCT switches, or other types of semiconductor switches. The turns ratio n of the transformers may be any arbitrary number. In applications where the output voltage is too low to neglect the diode voltage drop, all the rectifier diodes can be replaced by synchronized rectifiers (SR) in order to reduce power losses. Each synchronized rectifier may comprise a semiconductor switch connected in parallel with a diode, where the semiconductor switch is switched on when the diode is forward biased. The switch provides a low resistance path in parallel with the forward-biased diode, which significantly reduces the voltage drop. The inductors in parallel with the transformers may be independent components, may be realized by transformer magnetizing inductance, or may be omitted.

In the exemplary embodiment, the inverters of the N resonant converters are driven by N square-waveforms that are phase-shifted $2\pi/N$ or degrees apart. For the example of two resonant converters, the inverters of the resonant converters are driven $\pi$ degrees apart. For the example of three resonant converters, the inverters of the resonant converters are driven $2\pi/3$ degrees apart, and so forth. The N square-waveforms may be generated by a controller (not shown) coupled to the inverters. The controller may be similar to controllers used to drive conventional LLC series resonant converters except for generating N square-waveforms that are phase-shifted $2\pi/N$ apart instead of a single square-waveform.

Figure 3:
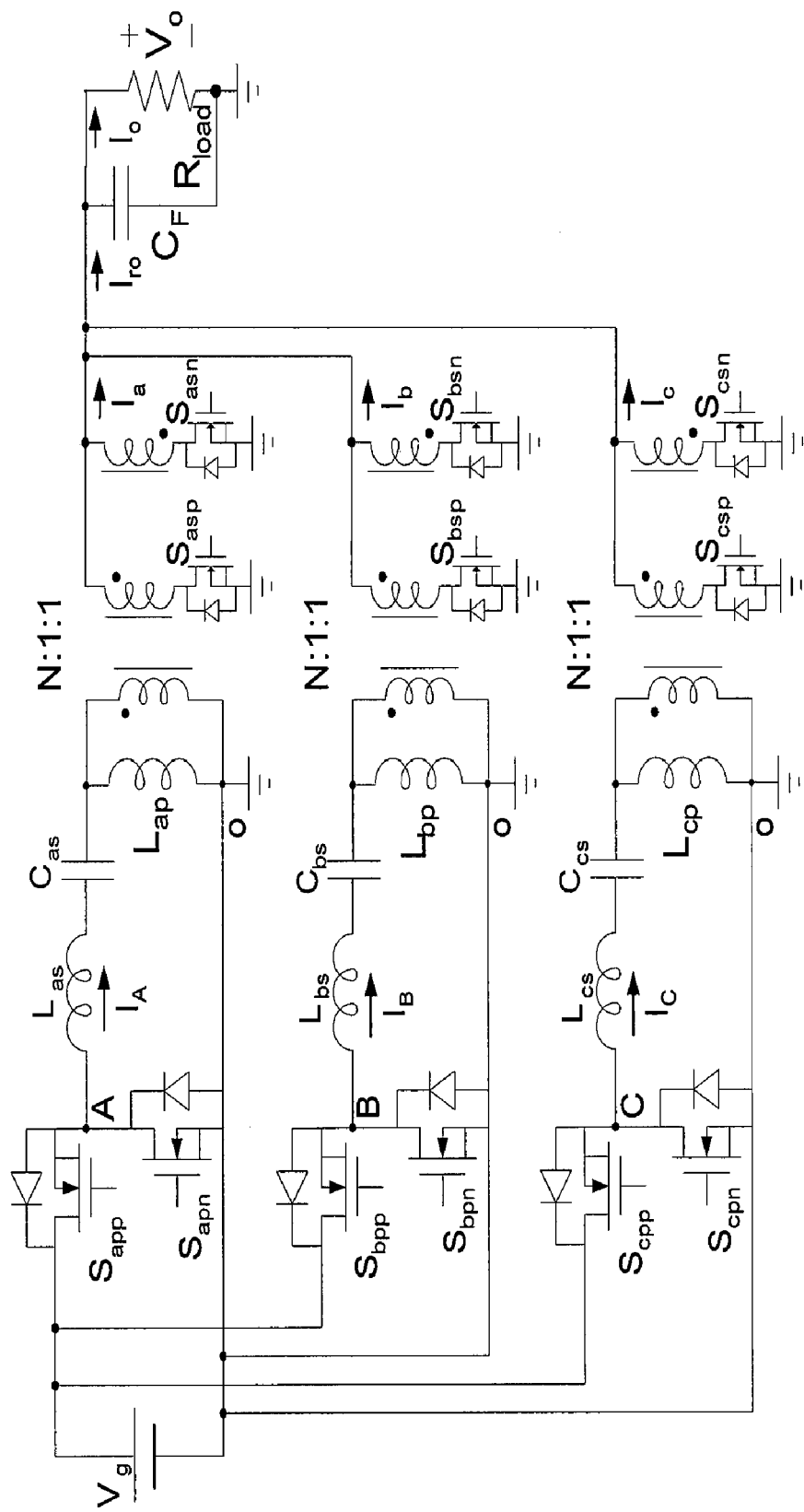
FIG. 3 is a circuit schematic of a three-phase LLC series resonant converter according to an embodiment of the present invention.

Without loss of generality, an example of a three-phase resonant converter for low output voltage applications, shown in FIG. 3, will be used to explain the working principles of multiphase resonant converters. In this example, the rectifier diodes in FIG. 2 are replaced by MOSFETs to realize synchronized rectifiers (SRs), and, to simplify the driver circuit, the sources of all MOSFETs are connected to electrical ground.

In this example, three square-waveforms with $2\pi/3$ degree phase shift are used to drive the half bridges at the primary side. The driving switching frequency is slightly higher than the resonant frequency of the resonant tanks. Since the converter is operating in the inductive region, the currents in each resonant tank $I_A$, $I_B$ and $I_C$ lag their corresponding exiting voltages $V_{AO}$, $V_{BO}$, and $V_{CO}$. The tank currents are transformed and rectified at the secondary side to form rectified currents $I_a$, $I_b$, and $I_c$, and the sum of all the rectified currents $I_{ro}$ flows to the filter capacitor(s) $C_F$ and load(s). Compared to the rectifier's output currents $I_a$, $I_b$, and $I_c$, the ripple in the sum current $I_{ro}$ is dramatically reduced, which can reduce the losses in the output filter.

Figure 4:
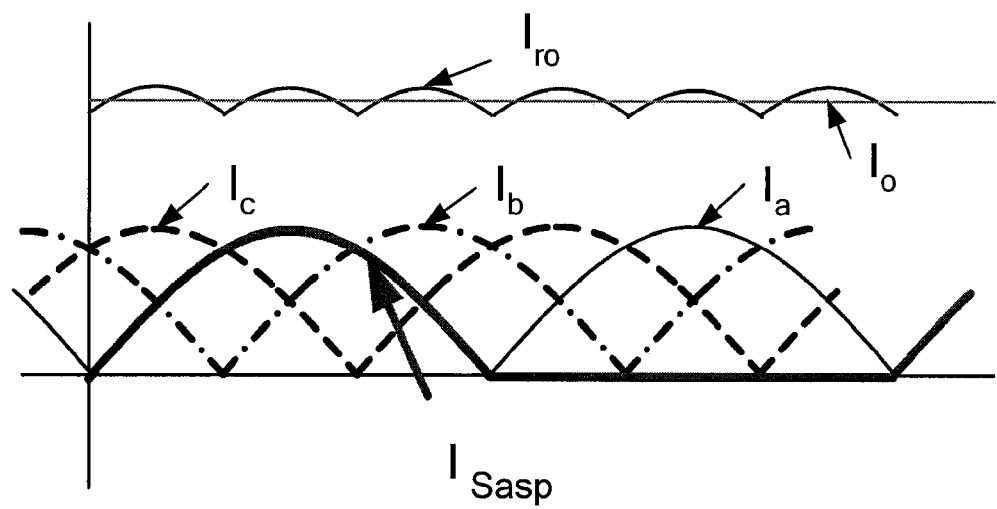
FIG. 4 shows a current plot for calculating the RMS current in each rectifier's MOSFET.

The steady-state performance of a converter includes switching turn-on and turn-off characteristic as well as the RMS current in the rectifier's MOSFETs. For the example of the three-phase LLC series resonant converter, natural ZVS and ZCS are guaranteed for the rectifier switches, and the natural ZVS can be achieved for the inverter switches with inductive load. Furthermore, the RMS current in each rectifier's MOSFET can be calculated with the aid of FIG. 4. According to the symmetry of the converter, the currents in all rectifier MOSFETs should be similar. Therefore, as an example, the current in $S_{asp}$ is bolded in FIG. 4. As shown in FIG. 4, the current in $S_{asp}$ is approximately a half-sinusoidal waveform. Based on the assumption that $I_o$ is the dc component of $I_{ro}$, and the geometry relationship between $I_{ro}$ and $I_{Ssap}$, the RMS value of the current in $S_{asp}$ is derived and expressed below.

$$I_{Sasp\_rms} = \frac{I_o \cdot \pi}{12} \tag{1}$$

Equation (1) indicates that compared to the total output current, the RMS current in each rectifier MOSEFT is much smaller. Therefore, the multiphase resonant converter reduces conduction losses in the secondary rectifiers, which increases efficiency. For example, if the output $I_o$ is 70 A, $I_{Sasp\_rms}$ will be 18.3 A only.

Figure 5A:
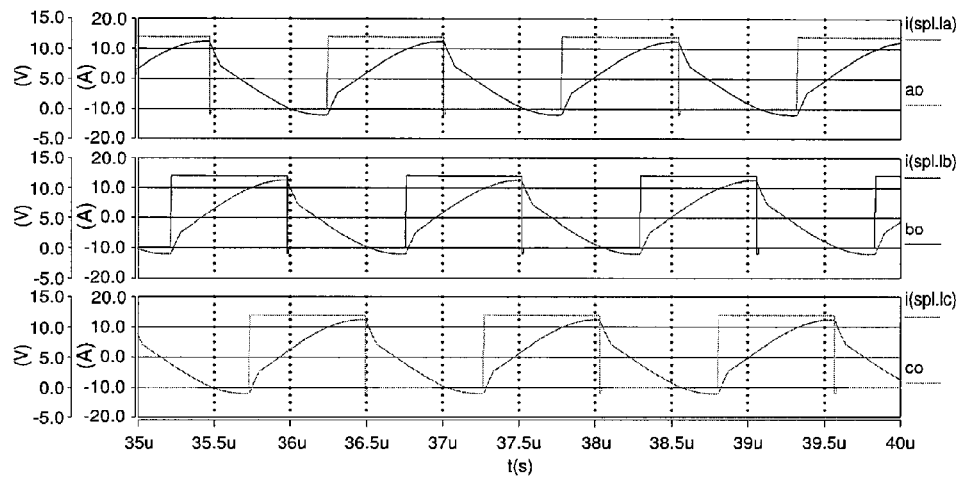
FIG. 5(a) shows the output voltages of the inventers and the currents of the resonant tanks for the three-phase LLC series resonant converter.
Figure 5B:
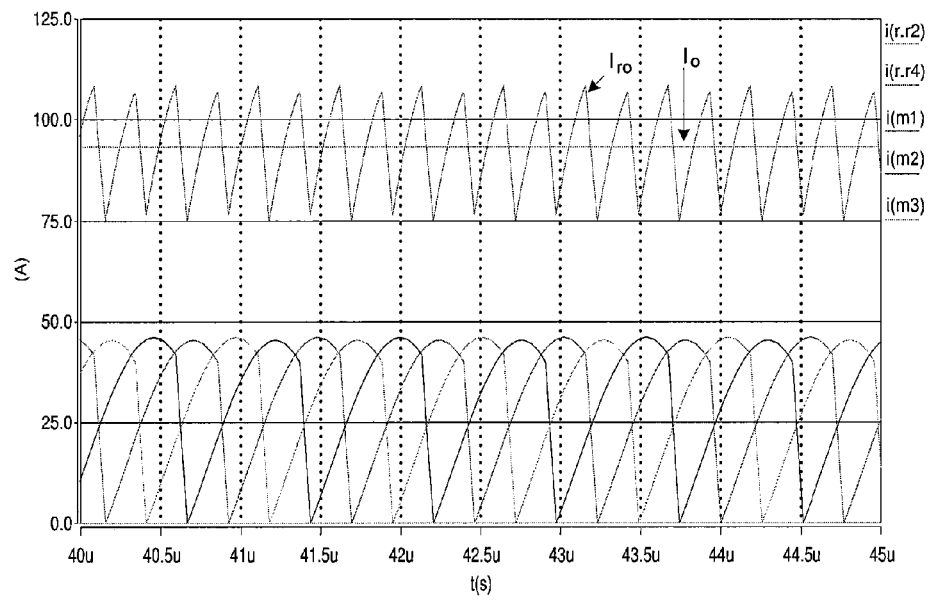
FIG. 5(b) shows steady-state current waveforms for the three-phase LLC series resonant converter.

To verify the steady-state analysis, a simulation model based on Saber™ was built, and its simulation results are depicted in FIGS. 5(a) and (b). FIG. 5(a) shows the inverter output voltages and tank currents, and FIG. 5(b) shows the rectifier output currents. Although the current waveforms of the resonant tanks in FIG. 5(a) are not sinusoidal, the results still closely correlate to the theoretical prediction.

Figure 6A:
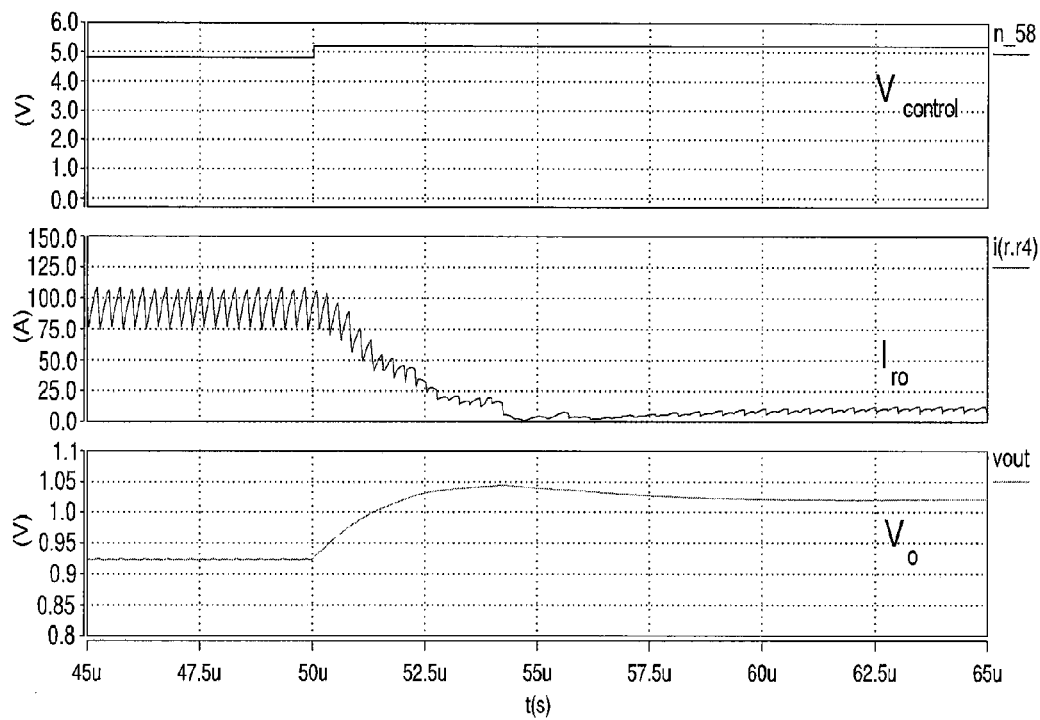
FIG. 6(a) shows transient waveforms from load to 10% load for the three-phase LLC series resonant converter.
Figure 6B:
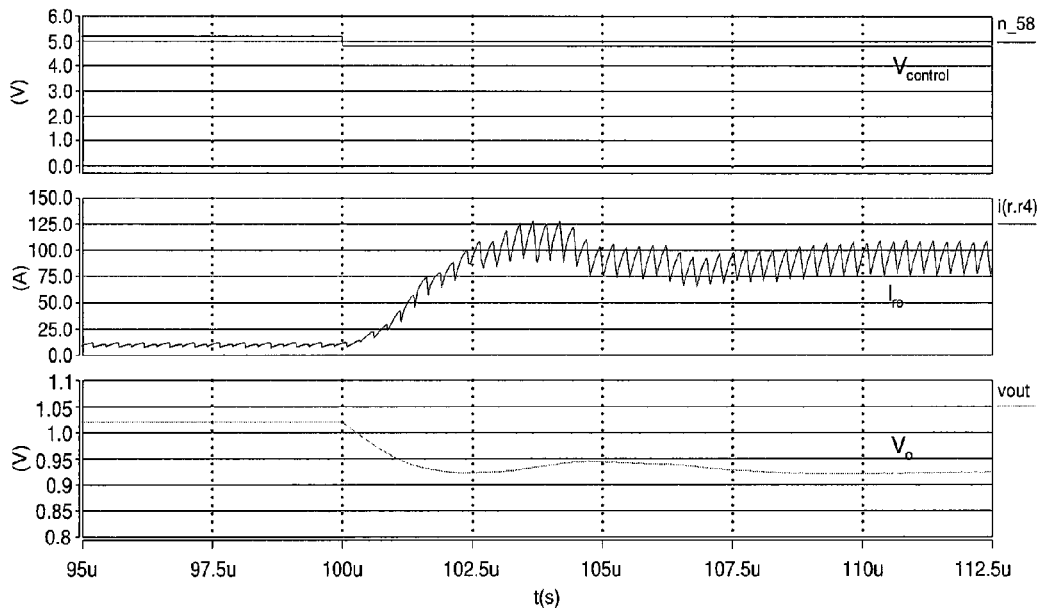
FIG. 6(b) shows transient waveforms from 10% load to full load the three-phase LLC series resonant converter.

Furthermore, the multiphase resonant converter has a fast transient response. Saber dynamic simulation results for load changing from full load condition to 10% load condition and vice verse are shown in FIGS. 6(a) and (b). FIG. 6(a) shows the transient waveforms from full load to 10% load, and FIG. 6(b) shows the transient waveforms from 10% load to full load. In the simulation, the input voltage is 12 V, the output voltage is 1 V, and the switching frequency varies between 650 Hz and 700 Hz. The values of resonant capacitors $C_s$, resonant inductor $L_s$, and dc capacitor $C_F$ are 1.224 uF, 100 nH, and 1000 uF, respectively. During the transient, the load is changed from 10 A to 100 A (and from 100 A to 10 A) with a slew rate of 100 A/ns. The waveforms in FIG. 6(a) show that the transient process from full load to 10% load only takes 2.5 us, the maximum output voltage is 1.044 V, and the current slew rate is about 40 A/us. The waveforms in FIG. 6(b) show that the transient process from 10% load to the full load is about 2.5 us, the minimum output voltage is 0.923 V, and the current slew rate is about 40 A/us. The dynamic response can be further improved by increasing the converter's switching frequency.

Figure 7:
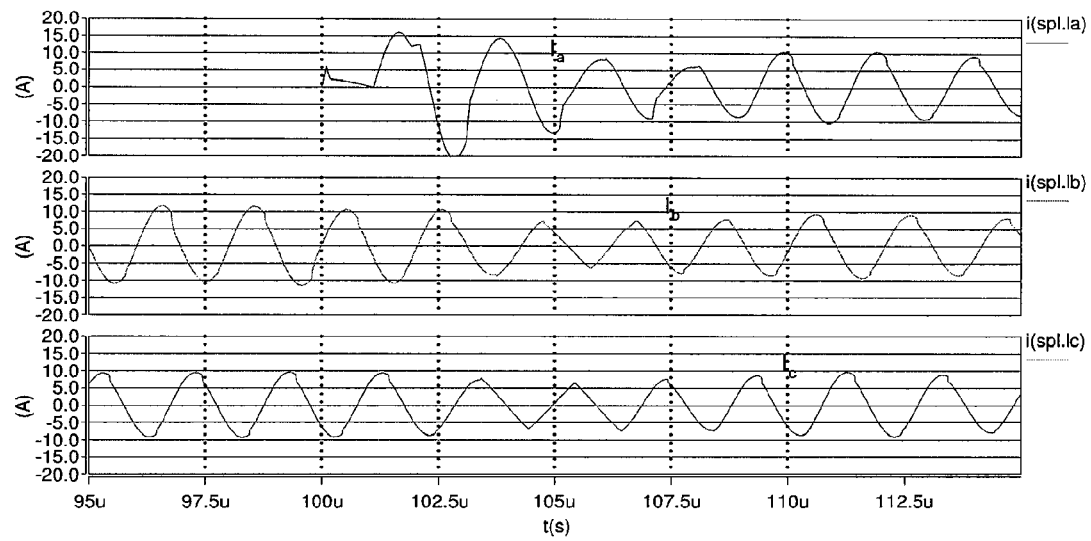
FIG. 7 shows a current plot demonstrating automatic current sharing of the three-phase LLC series resonant converter.

A simulation was conducted to verify the current sharing ability of the multiphase converter. At the beginning of the simulation, phase A is disconnected from the system, and the output current is shared by phase B and C. After 100 us, phase A is suddenly connected to the system to share the output current with phase B and C. The simulation results in FIG. 7 show the current waveforms of $I_a$, $I_b$, and $I_c$. At the beginning $I_a=0$, and $I_b$ and $I_c$ have the same amplitude. At t=100 us phase A is connected to the system, then after 10 us the amplitudes of $I_a$, $I_b$, and $I_c$ become the same, which means phase A automatically shares the load current with phase B and C. Thus, the multi-phase resonant converter has automatic current sharing ability among the unit converters without the need for additional current sensors and control circuitry.

Although the above analysis is based on a three-phase LLC series resonant converter, the concept applies generally to N-phase (N>1) structures. Table 1 below lists the detailed output current ($I_{ro}$) ripples, the minimum and maximum values of output current, and RMS current in each rectifier MOSFET for 3-phase, 4-phase, and 5-phase converters. Table 1 indicates that with more phases in parallel the output ripple currents and the RMS current in each MOSFET are further reduced.

TABLE 1

COMPARISON OF MULTIPHASE LLC RESONANT CONVERTERS

| Phase Number | Frequency of Output Current Ripple | Minimum Current | Maximum Current | RMS Current in each MOSFET |
|---|---|---|---|---|
| 3 | 6 | $\sqrt{3} \cdot \pi \cdot Io / 6$ | $\pi \cdot Io / 3$ | $\pi \cdot Io / 12$ |
| 4 | 4 | $\pi \cdot Io / 4$ | $\sqrt{2} \cdot \pi \cdot Io / 4$ | $\pi \cdot Io / 16$ |
| 5 | 10 | $0.308 \cdot \pi \cdot Io$ | $0.324 \cdot \pi \cdot Io$ | $\pi \cdot Io / 20$ |

In summary, the studies above show that multiphase LLC resonant converters have the following features:
1) Zero voltage switching for both inverter and rectifier switches;
2) Wide load range;
3) Limited switching frequency swing;
4) Fast dynamic response;
5) High efficiency (by sharing current at high current rectifier side); and
6) Automatic current sharing ability with no need for additional current sensor and control circuitry.

All of these features indicate that multiphase LLC resonant converters are excellent candidates for voltage regulation of the next generation microprocessors.

Multiphase LLC resonant converters are suitable for dc/dc conversions where high efficient, small size, high current handling capability, and fast transient speed are desired.

The multiphase LLC resonant converter can handle higher currents by simply adding more unit converters to the multiphase converter. Further, current sharing reduces current stress on the semiconductor switches and other individual components of the converter allowing for the use of lower tolerance components.

In low voltage high current converters, high efficiency rectification may be achieved by employing a synchronous rectifier (SR), where a low on-resistance MOSFET connected in parallel with a Schottkey diode lowers the overall voltage drop across the rectifier, thereby reducing its conduction losses. The name also implies that the MOSFET should be driven in synchronism with the diode conduction to minimize the voltage drop, and the best rate of efficiency is achieved when the MOSFET conducts all of the forward current with the diode in cutoff. Therefore, timing of the SR drive circuit's MOSFETs is of extreme importance. Unfortunately, precise timing is difficult to obtain in practice due to the inherent circuit delays of high frequency circuits. Loss of correct timing may cause the MOSFET's conduction of reverse current, discharging the output, which is highly undesirable.

Close observation finds that, comparable to digital logic circuit, all semiconductors in a power converter work either at "ON" or at "OFF" state, and therefore it's reasonable to use the logic analysis and synthesis tools, e.g. truth table and Karnaugh map, to derive the driving signals for the MOSFETs in an SR, and furthermore to prevent any undesirable triggers by adding proper logic protection circuit. In light of this idea, a general scheme is proposed to precisely time the SR drive circuit's MOSFETs according to an embodiment.

Figure 8:
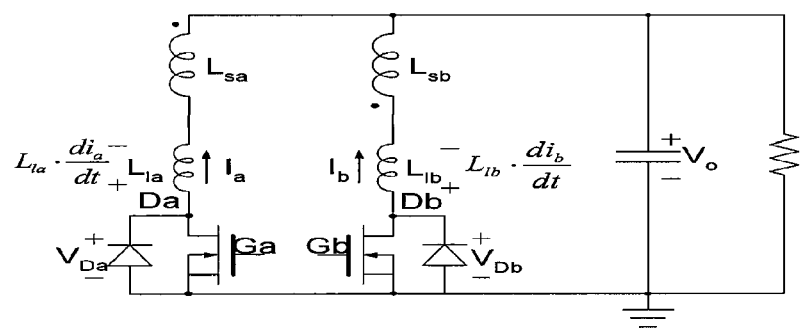
FIG. 8 shows an exemplary synchronous rectifier for a power switching converter.

To illustrate the scheme, an LLC series resonant converter's output rectifier and its ideal operation waveforms are depicted in FIG. 8. As shown, the MOSFETs "a" and "b" are in parallel with the diodes "a" and "b" respectively, and their "ON" and "OFF" states are directly related to the "ON" and "OFF" states of the corresponding diodes. Hence, the cathode potential states of diodes "$D_a$" ($V_{Da}$) and "$D_b$" ($V_{Db}$) can be used to judge the diodes' "ON" and "OFF" states and define them as logic inputs. The gate signals of the MOSFETs "$G_a$" and "$G_b$" can be used as the logic outputs. For convenience, the "high" voltage is defined as logic "1", and the "low" voltage is defined as logic "0". For each diode, the "high" voltage is approximately equal to $V_o$ with the diode in the "OFF" state (reversed-biased), and the "low" voltage is near zero with the diode in the "ON" state.

The circuit's physical operation rules are summarized as follows,
If diode "a" is "ON" and diode "b" is "OFF", MOSFET "a" should be "ON" and MOSFET "b" should be "OFF";
If diode "b" is "ON" and diode "a" is "OFF", MOSFET "b" should be "ON" and MOSFET "a" should be "OFF"; and
If both diodes are "ON" or both diodes are "OFF", all MOSFETs should be "OFF".

Figure 9A:
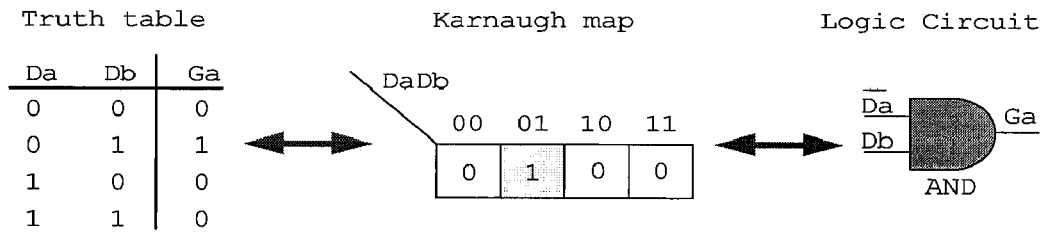
FIGS. 9(a) and (b) show truth tables and Karnaugh maps used for implementing the logic circuit of a synchronous rectifier circuit.
Figure 9B:
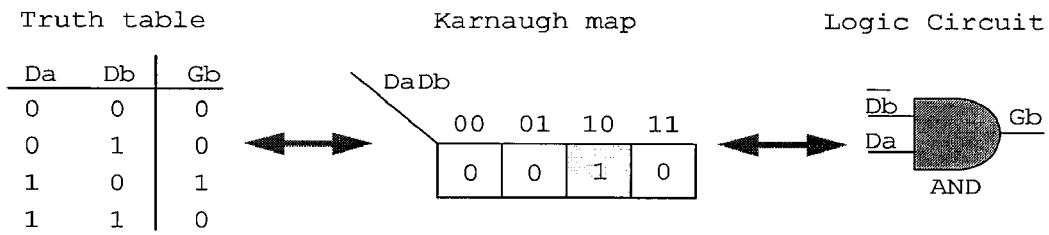

After translating the rules into corresponding logic states, the truth tables and Karnaugh maps for "$G_a$" and "$G_b$" are derived and depicted in FIGS. 9(a) and (b). FIGS. 9(a) and (b) also shows corresponding logic circuits.

Figure 10:
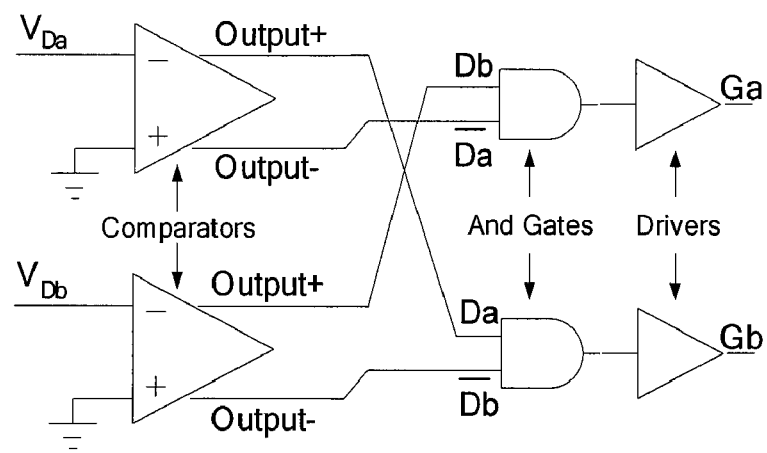
FIG. 10 shows a synchronous rectifier circuit according to an embodiment of the present invention.

The logic circuits in FIGS. 9(a) and (b) show that the logic relationships in the SR can be described by two "AND" gates. Additionally, by combining the "AND" gates in FIGS. 9(a) and (b) with logical state decision circuits and driving circuits, a SR circuit can be achieved as depicted in FIG. 10. In the example shown in FIG. 10, the logical state decision circuits comprise comparators, where each comparator has its negative input coupled to the cathode potential of the corresponding diode and its positive input grounded.

In practice, non-ideal components will cause voltage oscillation, which may distort the comparators' output waveforms and generate error driving signals. To overcome these problems, some specials circuit may need to be added. The proposed derivation procedure for SR is not limited to multiphase resonant converters and can be used for all other switching mode power converters. For any given converter, the first step is to find all pulse signals, which are related to the "ON" and "OFF" states of the rectifier's diodes, and then select some physical available signals as logic inputs, and derive the corresponding logic circuit for each SR MOSFET. Finally, one must combine the derived logic circuit with the logical state decision circuits and driving circuits to realize a complete SR circuit.

Figure 11:
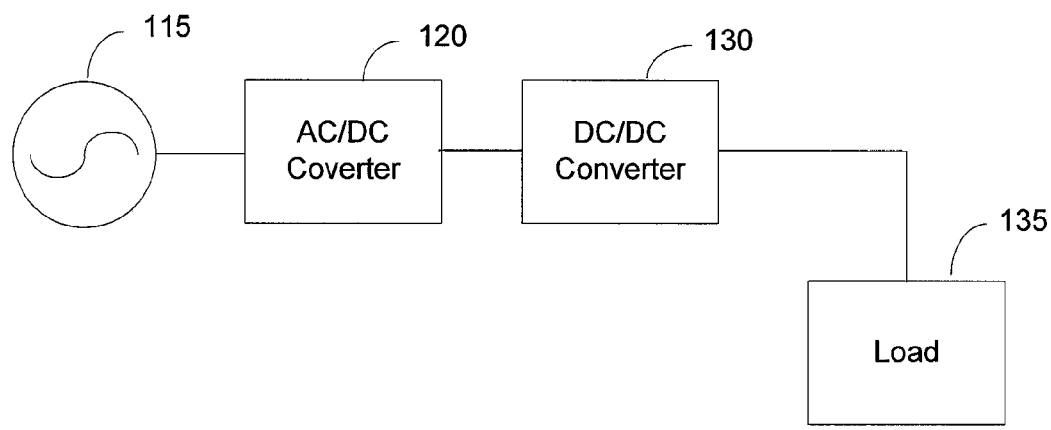
FIG. 11 shows an example of a system using a multiphase resonant converter according to an embodiment of the invention.

FIG. 11 shows an example of a system in which a multiphase resonant converter may be used. The system comprises an AC/DC converter 120, a multiphase resonant converter 130 for providing dc-dc conversion, and a load 135. The AC/DC converter converts an ac signal (e.g., 120 V AC) from an ac source 115 to a dc voltage (e.g., 12 V DC). The multiphase resonant converter 130 converts the dc voltage from the AC/DC converter to another voltage, which is supplied to the load 135. The load 135 may comprise a single device (e.g., microprocessor) or multiple devices that share a common voltage line. The multiphase resonant converter is well suited for processors that operate at low dc voltage and high current (e.g., 0.9 V and 120 A).

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the appended claims.

What is claimed is:

1. An N-phase resonant converter, comprising:
    N unit converters, each unit converter having an input and an output;
    wherein each unit converter comprises an inverter, an LLC series resonant tank coupled to the inverter, and a rectifier coupled to the LLC series resonant tank, and wherein the inputs of the unit converters are connected in parallel and the outputs of the unit converters are connected in parallel;
    wherein the rectifier of each unit converter comprises a first synchronous rectifier and a second synchronous rectifier; wherein the first synchronous rectifier comprises a first diode and a first semiconductor switch in parallel with the first diode, and the second synchronous rectifier comprises a second diode and a second semiconductor switch in parallel with the second diode, and wherein the rectifier of each unit converter comprises a logic circuit coupled to the first and second synchronous rectifiers;
    wherein the logic circuit is configured to turn on the first semiconductor switch when the first diode is in an on state and the second diode is in an off state, turn on the second semiconductor switch when the first diode is in an off state and the second diode is in an on state, and turn off both the first and second semiconductor switches when both the first and second diodes are in the on state or both the first and second diodes are in the off state, and wherein the logic circuit comprises a first AND gate coupled to the first switch and a second AND gate coupled to the second switch.

2. The N-phase converter of claim 1, further comprising a controller coupled to the inverters of the unit converters, wherein the controller is configured to drive the inverters with N drive signals that are phase-shifted 27E/N degrees apart.

3. The N-phase converter of claim 1, further comprising a low-pass filter coupled to the outputs of the unit converters.

4. The N-phase converter of claim 3, wherein the low-pass filter comprises a capacitor.

5. The N-phase converter of claim 1, wherein the first and second semiconductor switches comprise MOSFET switches.

6. The N-phase converter of claim 1, wherein the logic circuit is coupled to the cathode of the first diode, and the logic circuit is configured to determine whether the first diode is in the on or off state based on the electrical potential at the cathode of the first diode.

7. The N-phase converter of claim 6, wherein the logic circuit is coupled to the cathode of the second diode, and the logic circuit is configured to determine whether the second diode is in the on or off state based on the electrical potential at the cathode of the second diode.

8. A synchronous rectifier circuit comprising:
    a first synchronous rectifier comprising a first diode and a first semiconductor switch in parallel with the first diode;
    a second synchronous rectifier comprising a second diode and a second semiconductor switch in parallel with the second diode; and
    a logic circuit coupled to the first and second synchronous rectifiers,
    wherein the logic circuit is configured to turn on the first switch when the first diode is in an on state and the second diode is in an off state, turn on the second switch when the first diode is in an off state and the second diode is in an on state, and turn off both the first and second switches when both the first and second diodes are in the on state or both the first and second diodes are in the off state, and wherein the logic circuit comprises a first AND gate coupled to the first switch and a second AND gate coupled to the second switch.

\* \* \* \* \*